Nov. 9, 1965  M. PIGET  3,216,539
JOINT ASSEMBLY
Filed Oct. 21, 1963  2 Sheets-Sheet 2
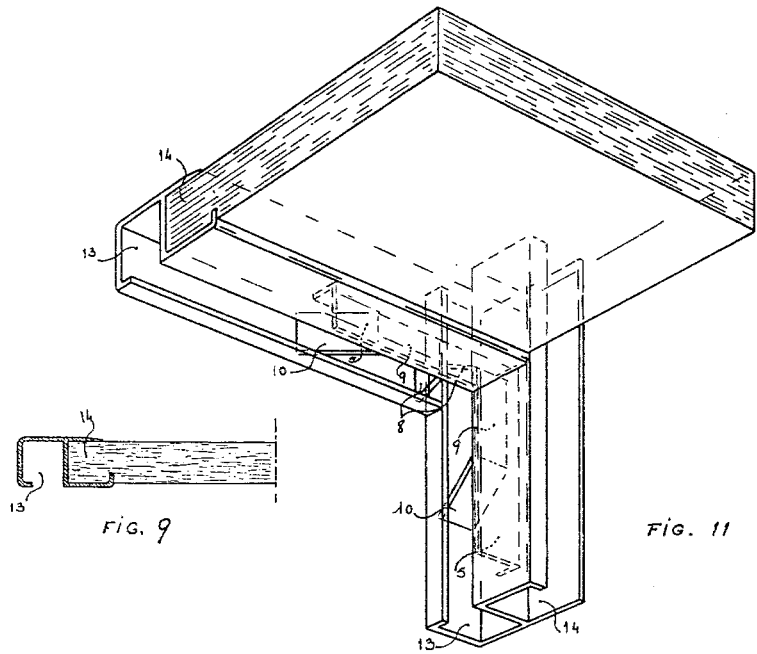
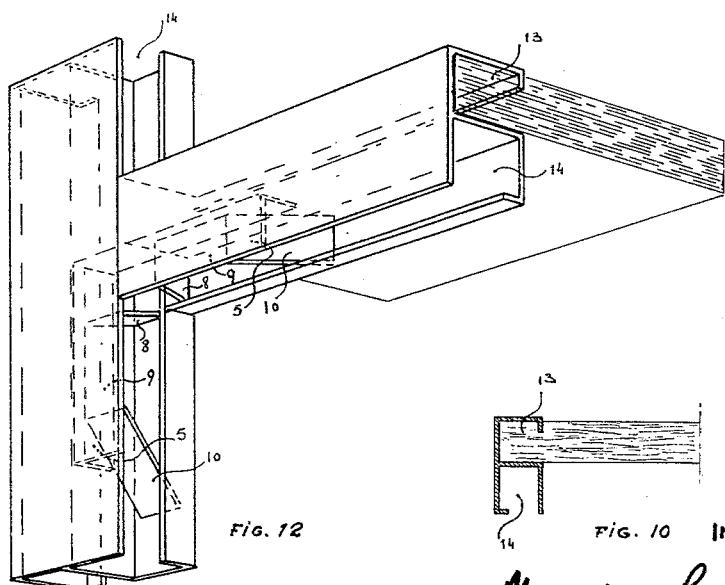
INVENTOR
Maurice Piget
BY
Lane, Aitken, Dunner & Ziems
ATTORNEYS

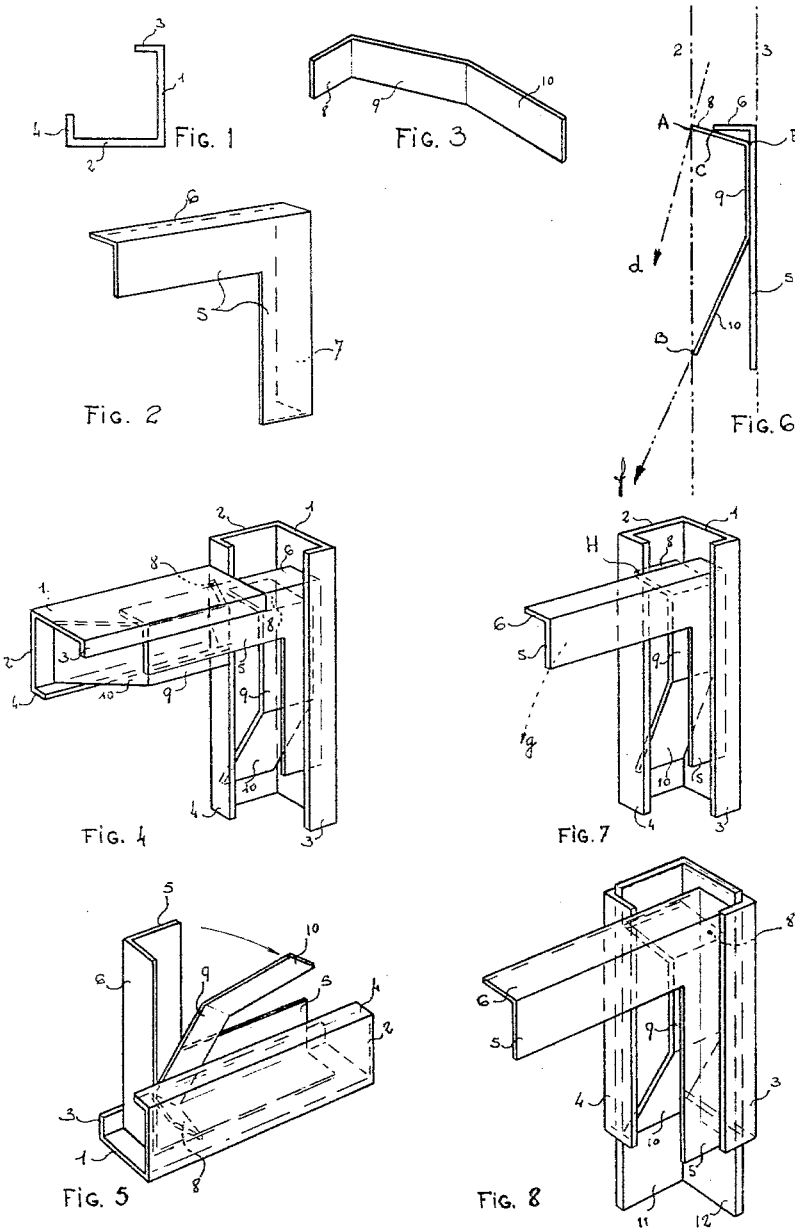

United States Patent Office 3,216,539
Patented Nov. 9, 1965

3,216,539
JOINT ASSEMBLY
Maurice Piget, 2 Rue Breuvery, Saint Germain en Laye, France
Filed Oct. 21, 1963, Ser. No. 317,670
Claims priority, application France, Oct. 25, 1962, 913,409, Patent 1,345,121
4 Claims. (Cl. 189—36)

The present invention relates to an orthogonal joint assembly of two profiled members, wherein the assembly uses a connecting member comprising an angle tightened against the inner surface of the two profiles by a support plate forming a spring.

This novel joint may be used, by way of example, with any profile having two mutually perpendicular support faces and possibly a back angle, the size of which may vary, wherein these back angles leave sufficient space for the connecting members. The new joint is also suitable for two profiles with two perpendicular inlets, one of which is equipped with a filler panel, as described in U.S. Patent application Ser. No. 208,034 filed July 6, 1962, now abandoned.

The connecting members used in this assembly are: an angle in which each leg has L shaped cross-section; and a support plate for each of the two legs of the angle.

The invention will be further described by way of example with reference to the accompanying drawings.

FIG. 1 is a cross-section of a profile with two perpendicular surfaces 1 and 2, each formed with a back angle 3 and 4.

FIG. 2 is a perspective view of a connecting member in the form of an angle, the legs of which are formed by surface portions 5, 6 and 7.

FIG. 3 is a perspective view of the support plate in three legs 8, 9, 10, the two dihedral angles are larger than 90°.

FIG. 4 is a perspective view of an assembly of two profiles, one forming the supporting and the other the supported member, as shown in FIG. 1, and effected by means of an angle of the kind shown in FIG. 2 and two support plates as in FIG. 3. The surface 5 of the angle may be regarded as a bracket or as a filler element, the two dimensions of which are those of the profile.

FIG. 5 is a perspective view during the assembly of the support plate relative to the leg of the angle and the profile.

The weight of the members and the working stresses are transmitted to the supporting member from the angle leg associated with the supported profile to the angle leg associated with the carrying profile through the support plate for this latter leg by opposing the forces involved in the sliding action and those involved in the warping.

FIG. 6 indicates the actions resulting from the sliding forces and shows diagrammatically along an axis of the carrier profile the associated angle leg and support plate. Against the surface 2 of the supporting profile rest the ends A and B of the resilient legs 8 and 10 of the support plate. The reaction of these legs to the stresses imposed on them balances the weight of the members, and the contact points A and B form a primary anchorage. The metal selected for the angle and the support plate (steel) is harder than that of the profiles (aluminium). The surface 5 of the angle resting against the leg 9 of the support plate acts with friction against the back angle 3 of the carrier profile. The loads applied to the supported profile and transmitted thereto from the horizontal leg 6 of the angle are transmitted at C to the leg 8 of the support plate and directed on the one hand in the direction $d$, determining the support against the surface 2 and on the other hand at E in the leg 9 of the support plate and through the same in the leg 10 in the direction $f$, determining at B the anchorage against the surface 2.

The anchorages at A and B cause an increase in the stresses of the elastic plate.

FIG. 7 shows the actions resulting from the upsetting forces under the operating loads affecting the supported profile and tending to tilt the horizontal leg of the angle in the direction $g$. This tilting is transmitted through the other leg of the angle to the part 8 of the supporting plate and absorbed at H by the back angle 4 of the supporting profile. Since this action is perpendicular to the back angle 4 it prevents any sliding and causes the firm seating in the back angle 4, owing to the choice of metals of different hardness for the support plate (steel) and the profile (aluminium).

FIG. 8 is a perspective view of a variation of the assembly with a supporting profile with two perpendicular surfaces 11 and 12, but without back angles. In order to retain the angle and the support plate, the carrying profile is grooved at the level of the angle and its support plate, a flange being formed by an auxiliary element of the kind shown in FIG. 1, that is to say, having two perpendicular surfaces, each forming a back angle 3 and 4, respectively.

FIG. 9 is a diagrammatical cross-section of a known profile with two perpendicular inlets in which a filler panel is fitted into the space 14.

FIG. 10 is a diagrammatical cross-section of a known profile with two perpendicular inlets operating in the thicker section and having a filler panel in the space 13.

FIG. 11 is a perspective view of the orthogonal assembly of two profiles, namely, a supporting and a supported profile with two perpendicular inlets, as in FIG. 9, in which the connecting members are introduced into the space 13 of each profile.

FIG. 12 is a perspective view of the orthogonal assembly of two profiles, namely, a supporting and a supported profile with two perpendicular inlets as in FIG. 10 in which the connecting members are introduced into the space 14 of each profile.

I claim:
1. In an assembly of orthogonal metal profiles without perforation applicable to all profiles with two perpendicular supporting surfaces and with back angles, a connecting member comprising an angle, each leg of which has an L-shaped cross-section and is associated with one of the profiles to be assembled, and an elastic plate supporting each leg of the angle against the inner surface of the back angle of the profile with which it is associated.

2. In an assembly as claimed in claim 1 of two profiles with two perpendicular surfaces without back angles in which the connecting member is introduced in an element with two perpendicular surfaces and back angles, one of said elements embracing each of the two profiles to be assembled.

3. In an assembly of two orthogonal metal profiles with two perpendicular inlets, one of which receives a filler panel, a connecting member, formed by an angle with legs with L-shaped cross-section, and an elastic plate associated with each leg introduced into the other inlet of the associated profile.

4. In an assembly of structural members each having a cross-section defining a pair of converging inner surfaces, a connecting member having a pair of legs each being of L-shaped cross-section, means defining a back angle spaced from one of said inner surfaces on at least one of the structural members, and an elastic plate having projecting leg portions engaging said one inner surface and biasing said connecting member against said back angle.

No references cited.

FRANK L. ABBOTT, *Primary Examiner.*
RICHARD W. COOKE, JR., *Examiner.*